United States Patent [19]
Leroy

[11] Patent Number: 5,812,642
[45] Date of Patent: Sep. 22, 1998

[54] AUDIENCE RESPONSE MONITOR AND ANALYSIS SYSTEM AND METHOD

[76] Inventor: David J. Leroy, 5372 N. Via Alcade, Tucson, Ariz. 85718

[21] Appl. No.: 501,436

[22] Filed: Jul. 12, 1995

[51] Int. Cl.$^6$ .................................................. H04M 11/00
[52] U.S. Cl. .................................. 379/92.01; 379/93.12; 705/14; 705/10; 705/26
[58] Field of Search .................. 379/92, 91, 90.01, 379/92.01, 92.02, 92.03, 92.04, 93.01, 265, 266; 348/1, 6, 7, 10–12; 364/400; 395/205, 212, 222, 226, 228; 705/5, 7, 8, 10, 12, 22, 26, 28, 14; 455/2

[56] References Cited

U.S. PATENT DOCUMENTS

| | | | |
|---|---|---|---|
| 4,451,700 | 5/1984 | Kempner et al. | 379/92 |
| 4,696,029 | 9/1987 | Cohen | 379/92 |
| 4,797,911 | 1/1989 | Szlam et al. . | |
| 4,989,234 | 1/1991 | Schakowsky et al. . | |
| 5,097,528 | 3/1992 | Gursahaney et al. | 379/92 |
| 5,164,983 | 11/1992 | Brown et al. . | |
| 5,168,515 | 12/1992 | Gechter et al. . | |
| 5,299,260 | 3/1994 | Shaio . | |
| 5,530,469 | 6/1996 | Garfinkle | 455/2 |
| 5,539,822 | 7/1996 | Lett | 348/2 |
| 5,561,707 | 10/1996 | Katz | 379/91 |

*Primary Examiner*—Curtis A. Kuntz
*Assistant Examiner*—Stephen W. Palan
*Attorney, Agent, or Firm*—Allen, Dyer, Doppelt, Milbrath & Gilchrist, P.A.

[57] ABSTRACT

A system and method are provided for monitoring and analyzing audience response to a broadcast promotion. The specific embodiment for fund-raising campaigns for public television stations is addressed, wherein the taking of pledges over the telephone is automated, the response data entered directly into a computer with the use of scripted screens. The effectiveness of segments of the campaign is calculated by correlating the response data, including the number of telephone calls received, with each promotion segment. Additional methods of manipulating and displaying response data are also disclosed, including the use of demographic and audience ratings to provide an indication of the effectiveness of a promotion segment.

8 Claims, 18 Drawing Sheets

FIG. 2(a).

MMMMMMMMMMMMMMMMMMMMMMMMMMMMMMMMMMMMMMMMMMMMMMMMMMMMMMMMM
: BREAK CODE: GOD48
:
:
: WXYZ-TV, May I take your pledge?
:
: How much would you like to pledge?
:
: Which credit card would you like to use?
:  Visa  MasterCard  Amex  Discover  (CHECK)  EFT
:
: Card Number:  Exp Date:
:
: INSTALLATION AMOUNT:
:
: Would you like to receive a Welcome Gift?  MONTHLY?  QUARTERLY?
: NO GIFT:  PREMIUM:  PREMIUM:  YES  NO
:
: Your pledge of ___ qualifies you as a WXYZ member.
: You will receive 12 issues of WXYZ's monthly magazine and additional member
: benefits.  May we enroll you as a member?
HMMMMMMMMMMMMMMMMMMMMMMMMMMMMMMMMMMMMMMMMMMMMMMMMMMMMMMMMM
BACK, <F8>=QUIT
SCREENS: F1=PMT, F2=MEMBER, F4=DEMOGRAPHICS, F5=PREMIUMS, F6=COMMENTS

FIG. 2(b).

BREAK CODE: GOD48

Are you a member?   YES   NO   GIFT MEMBERSHIP

May I have your evening telephone number?

MEMBERSHIP#:                           RENEWAL DATE:

Now may I have your name and address?

NAME1:
NAME2:
ADDRESS1:
ADDRESS2:
CITY:                          STATE:           ZIP:
EMPLOYER:
DAYTIME PHONE:

BACK, <F8>=QUIT
SCREENS: F1=PMT, F2=MEMBER, F4=DEMOGRAPHICS, F5=PREMIUMS, F6=COMMENTS

FIG. 2(c).

BREAK CODE: GOD48

This is a Gift Membership for:

NAME:
ADDRESS:
CITY:					STATE:		ZIP:

Should the thank you gift be sent to you, the giver, or to the gift membership recipient?

Giver		Gift Membership Recipient

BACK, <F8>=QUIT
SCREENS: F1=PMT, F2=MEMBER, F3=GIFT MEMBER, F4=DEMOGRAPHICS, F5=PREMIUMS, F6=CO

FIG. 2(d).

BREAK CODE: GOD48

MMMMMMMMMMMMMMMMMMMMMMMMMMMMMMMMMMMMMMMMMMMMMMMM

I have just a few more questions from our member survey that will help WXYZ get to know you a little better. Your answers are completely confidential.
Would you mind answering our survey questions?

In which education group do you fall?
 Less than 4 yrs High School   High School Grad   1-3 yrs College
 4+ yrs College   No Reply What is your year of birth: 19
Which of the following best describes your race or ethnicity?
 Caucasian   African American   Hispanic   Asian American
 Native American   Other   No Reply In which income group do you fall?
 Less than $20,000   $20,000-$39,000   $40,000-$59,000
 Over $60,000   No Reply (DO NOT ASK) INDICATE SEX OF DONOR:   Male   Female   Don't Know
HMMMMMMMMMMMMMMMMMMMMMMMMMMMMMMMMMMMMMMMMMMMM BACK, <F8>=QUIT
SCREENS: F1=PMT, F2=MEMBER, F3=GIFT MEMBER, F4=DEMOGRAPHICS, F5=PREMIUMS, F6=CO

FIG. 2(e).

BREAK CODE: GOD48

MMMMMMMMMMMMMMMMMMMMMMMMMMMMMMMMMMMMMMMMMMMMMMMMMMMM

Other than tonight, what was the last program you watched on WXYZ?

COMMENTS:
1:
2:
3:

Thank you for your pledge. Your contribution will appear on your next credit card statement.

VOLUNTEER NAME: LORI

CHECK HERE WHEN FINISHED
HMMMMMMMMMMMMMMMMMMMMMMMMMMMMMMMMMMMMMMMMMMMMMMMMMM

BACK, <F8>=QUIT
SCREENS: F1=PMT, F2=MEMBER, F3=GIFT MEMBER, F4=DEMOGRAPHICS, F5=PREMIUMS, F6=CO

FIG. 2(f).

DAILY TAB

| TOTALS FOR 12/03/94 | | BEST PROGRAM | |
|---|---|---|---|
| DOLLARS: $ 81,970 | | MOST DOLLARS: | THE THREE TENORS IN CONCERT 19 |
| PLEDGES: 1,037 | | MOST PLEDGES: | THE THREE TENORS IN CONCERT 19 |

| PROGRAM NAME | # OF BREAKS | # MIN. | # PLEDGES | $ PER MIN. | AVG. PLEDGE | TOTAL DOLLARS |
|---|---|---|---|---|---|---|
| COVERT BAILEY'S SMART EXER | 4 | 39 | 122 | 246 | 79 | $ 9,610.00 |
| DON'T EAT YOUR HEART OUT | 2 | 19 | 35 | 113 | 62 | $ 2,155.00 |
| EAGLES IN THE SPOTLIGHT | 2 | 15 | 13 | 63 | 73 | $ 945.00 |
| GUY LOMBARDO & HIS ROYAL CANAD | 3 | 28 | 103 | 277 | 75 | $ 7,765.00 |
| LAWNS AND GARDENS WITH JERRY B | 2 | 23 | 109 | 355 | 75 | $ 8,155.00 |
| NATURE: MOZU THE SNOW MONKEY | 3 | 31 | 60 | 124 | 64 | $ 3,851.00 |
| PETER, PAUL & MARY HOLIDAY SPE | 4 | 31 | 77 | 256 | 103 | $ 7,945.00 |
| PETER, PAUL & MARY HOLIDY SPEC | 2 | 16 | 13 | 56 | 69 | $ 900.00 |
| SEWING WITH NANCY SPECIAL: MIN | 3 | 32 | 88 | 169 | 61 | $ 5,399.00 |
| THE THREE TENORS IN CONCERT 19 | 5 | 53 | 209 | 343 | 87 | $ 18,165.00 |
| VICTOR BORGE: THEN AND NOW II | 4 | 29 | 208 | 589 | 82 | $ 17,080.00 |

FIG. 5.

PROGRAM SUMMARY
SORTED BY PROGRAM

| Program | Date | Week Day | Start Time | Break Min. | # Breaks | Pledges | Total Dollars | Avg. Pledge |
|---|---|---|---|---|---|---|---|---|
| | 12/08/94 | Thu | | 18 | 2 | 6 | 330.00 | 55.00 |
| Total for | | | | 18 | 2 | 6 | 330.00 | 55.00 |
| A CHRISTMAS SPECIAL W/ L PAVAROTT | | | | | | | | |
| | 12/06/94 | Tue | 19:00 | 23 | 2 | 116 | 6,991.00 | 60.27 |
| Total for A CHRISTMAS SPCL W/ L PAVAROTT | | | | 23 | 2 | 116 | 6,991.00 | 60.27 |
| A CHRISTMAS SPECIAL W/PAVAROTT | | | | | | | | |
| | 12/13/94 | Tue | 21:00 | 17 | 2 | 33 | 2,195.00 | 66.52 |
| Total for A CHRISTMAS SPECIAL W/PAVAROTT | | | | 17 | 2 | 33 | 2,195.00 | 66.52 |
| BARNEY CELEBRATES CHILDREN | | | | | | | | |
| | 12/11/94 | Sun | 09:00 | 15 | 2 | 69 | 4,530.00 | 65.65 |
| Total for BARNEY CELEBRATES CHILDREN | | | | 15 | 2 | 69 | 4,530.00 | 65.65 |
| BARNEY CELEBRTES CHILDRN | | | | | | | | |
| | 12/04/94 | Sun | 09:00 | 16 | 2 | 36 | 2,439.51 | 67.76 |
| Total for BARNEY CELEBRTES CHILDRN | | | | 16 | 2 | 36 | 2,439.51 | 67.76 |
| BIRDS OF THE BACKYARD | | | | | | | | |
| | 12/10/94 | Sat | 13:30 | 14 | 2 | 14 | 825.00 | 58.93 |
| | 12/13/94 | Tue | 13:00 | 14 | 2 | 9 | 394.00 | 43.78 |
| Total for BIRDS OF THE BACKYARD | | | | 28 | 4 | 23 | 1,219.00 | 51.35 |
| BORGE THEN AND NOW II | | | | | | | | |
| | 12/08/94 | Thu | 19:00 | 28 | 4 | 144 | 9,595.00 | 66.63 |
| Total for BORGE THEN AND NOW II | | | | 28 | 4 | 144 | 9,595.00 | 66.63 |

PROGRAM SUMMARY
SORTED BY PROGRAM

Page 1

| $ Per Minute | Credit Card Rate | Membership Status | | Gift Membership |
|---|---|---|---|---|
| | | Current Member | New | |
| 18.33 | 16.7% | 100.0% | 0.0% | 0.0% |
| 18.33 | 16.7% | 100.0% | 0.0% | 0.0% |
| 303.96 | 66.4% | 64.7% | 33.6% | 1.7% |
| 303.96 | 66.4% | 64.7% | 33.6% | 1.7% |
| 129.12 | 66.7% | 54.5% | 45.5% | 0.0% |
| 129.12 | 66.7% | 54.5% | 45.5% | 0.0% |
| 302.00 | 69.6% | 42.0% | 56.5% | 1.4% |
| 302.00 | 69.6% | 42.0% | 56.5% | 1.4% |
| 152.47 | 63.9% | 19.4% | 80.6% | 0.0% |
| 152.47 | 63.9% | 19.4% | 80.6% | 0.0% |
| 58.93 | 78.6% | 71.4% | 28.6% | 0.0% |
| 28.14 | 44.4% | 77.8% | 22.2% | 0.0% |
| 43.54 | 65.2% | 73.9% | 26.1% | 0.0% |
| 342.68 | 60.4% | 60.4% | 38.9% | .7% |
| 342.68 | 60.4% | 60.4% | 38.9% | .7% |

FROM FIG. 6(a).

FIG. 6(b).

PROGRAM SUMMARY
BY DATE

December 3, 1994

| Program | Time Start | Break Min. | # Breaks | Pledges | Total Dollars | Avg. Pledge |
|---|---|---|---|---|---|---|
| EAGLES IN THE SPOTLIGHT | | 15 | 2 | 13 | 945.00 | 72.69 |
| SEWING WITH NANCY SPECIAL: MIN | 08:00 | 32 | 3 | 88 | 5,399.00 | 61.35 |
| LAWNS AND GARDENS WITH JERRY B | 09:30 | 23 | 2 | 109 | 8,155.00 | 74.82 |
| COVERT BAILEY'S SMART EXER | 10:30 | 39 | 4 | 122 | 9,610.00 | 78.77 |
| DON'T EAT YOUR HEART OUT | 12:30 | 19 | 2 | 35 | 2,155.00 | 61.57 |
| NATURE: MOZU THE SNOW MONKEY | 13:30 | 31 | 3 | 60 | 3,851.00 | 64.18 |
| PETER, PAUL & MARY HOLIDAY SPE | 15:00 | 31 | 4 | 77 | 7,945.00 | 103.18 |
| GUY LOMBARDO & HIS ROYAL CANAD | 17:00 | 28 | 3 | 103 | 7,765.00 | 75.39 |
| VICTOR BORGE: THEN AND NOW II | 18:30 | 29 | 4 | 208 | 17,080.00 | 82.12 |
| THE THREE TENORS IN CONCERT 19 | 20:15 | 53 | 5 | 209 | 18,165.00 | 86.91 |
| PETER, PAUL & MARY HOLIDY SPEC | 23:00 | 16 | 2 | 13 | 900.00 | 69.23 |
| TOTAL FOR 12/03/94 | | 316 | 34 | 1,037 | 81,970.00 | 75.47 |

PROGRAM SUMMARY BY DATE

Page 1

| $ Per Minute | Credit Card Rate | Membership Status | | |
|---|---|---|---|---|
| | | Current Member | New | Gift Membership |
| 63.00 | 84.6% | 100.0% | 0.0% | 0.0% |
| 168.72 | 75.0% | 36.4% | 60.2% | 3.4% |
| 354.57 | 76.1% | 35.8% | 64.2% | 0.0% |
| 246.41 | 64.8% | 36.9% | 63.1% | 0.0% |
| 113.42 | 57.1% | 40.0% | 60.0% | 0.0% |
| 124.23 | 41.7% | 41.7% | 58.3% | 0.0% |
| 256.29 | 58.4% | 35.1% | 64.9% | 0.0% |
| 277.32 | 67.0% | 42.7% | 56.3% | 1.0% |
| 588.97 | 64.9% | 43.3% | 56.7% | 0.0% |
| 342.74 | 65.6% | 46.9% | 53.1% | 0.0% |
| 56.25 | 53.8% | 76.9% | 23.1% | 0.0% |
| 259.40 | 65.3% | 42.1% | 57.5% | .4% |

(FROM FIG. 6(c).)

FIG. 6(d).

PLEDGE LEVEL SUMMARY
BY PROGRAM

Page 4

| Pledge Amount | Pledges | Credit Card Rate | Membership Current Member | Membership New Member | Gift Membership | Percent Dollars | Percent Pledges |
|---|---|---|---|---|---|---|---|
| BIRDS OF THE BACKYARD | | | | | | | |
| 12/13/94 Tue | | | | | | | |
| 60.00 | 1 | 100.0% | 100.0 | 0.0 | 0.0 | 18% | 11% |
| 75.00 | 1 | 100.0% | 0.0 | 100.0 | 0.0 | 22% | 11% |
| 99.00 | 1 | 100.0% | 100.0 | 0.0 | 0.0 | 30% | 11% |

| Pledge Amount | Pledges | Credit Card Rate | Membership Current Member | Membership New Member | Gift Membership | Percent Dollars | Percent Pledges |
|---|---|---|---|---|---|---|---|
| BORGE THEN AND NOW II | | | | | | | |
| 12/08/94 Thu | | | | | | | |
| 5.00 | 1 | 0.0% | 0.0 | 100.0 | 0.0 | 0% | 1% |
| 10.00 | 3 | 0.0% | 0.0 | 100.0 | 0.0 | 1% | 2% |
| 12.00 | 1 | 0.0% | 0.0 | 100.0 | 0.0 | 1% | 1% |
| 15.00 | 3 | 66.7% | 66.7 | 33.3 | 0.0 | 1% | 2% |
| 20.00 | 9 | 33.3% | 66.7 | 33.3 | 0.0 | 1% | 6% |
| 25.00 | 17 | 58.8% | 52.9 | 47.1 | 0.0 | 1% | 12% |
| 40.00 | 17 | 70.6% | 64.7 | 35.3 | 0.0 | 2% | 12% |
| 49.00 | 1 | 100.0% | 100.0 | 0.0 | 0.0 | 3% | 1% |
| 50.00 | 40 | 60.0% | 60.0 | 37.5 | 2.5 | 3% | 28% |
| 60.00 | 1 | 100.0% | 100.0 | 0.0 | 0.0 | 3% | 1% |
| 90.00 | 29 | 72.4% | 62.1 | 37.9 | 0.0 | 5% | 20% |
| 99.00 | 1 | 100.0% | 0.0 | 100.0 | 0.0 | 6% | 1% |
| 100.00 | 12 | 50.0% | 75.0 | 25.0 | 0.0 | 6% | 8% |
| 150.00 | 8 | 62.5% | 62.5 | 37.5 | 0.0 | 9% | 6% |
| 1,000.00 | 1 | 100.0% | 100.0 | 0.0 | 0.0 | 58% | 1% |

FIG. 6(e).

BREAK RECAP

| | | | |
|---|---|---|---|
| Program: | VICTOR BORGE: THEN AND NOW II | Dollars Pledged: | $ 6,825.00 |
| Break Code: | AXD4B | # of Pledges | 92 |
| Date: | 12/03/94 | Credit Cards: | 58 |
| Break Start: | 19:40 | $ Per Minute: | $ 620.45 |
| Break Minutes: | 11 | Pledges/Minute: | 8.4 |

TYPE OF MEMBERSHIP

Current Member 45
New 47

ACTUAL PLEDGE LEVELS

| Amount | Pledges | Percent Pledges | Percent Dollars |
|---|---|---|---|
| 5.00 | 1 | 1% | 0% |
| 10.00 | 2 | 2% | 0% |
| 15.00 | 1 | 1% | 0% |
| 20.00 | 3 | 3% | 1% |
| 25.00 | 6 | 7% | 2% |
| 30.00 | 1 | 1% | 0% |
| 35.00 | 1 | 1% | 1% |
| 40.00 | 13 | 14% | 8% |
| 50.00 | 23 | 25% | 17% |
| 90.00 | 26 | 28% | 34% |
| 100.00 | 12 | 13% | 18% |
| 150.00 | 2 | 2% | 4% |
| 1,000.00 | 1 | 1% | 15% |

LEVEL OF EDUCATION

| | |
|---|---|
| Some High School | 13% |
| High School Graduate | 3% |
| Some College | 10% |
| College Graduate | 27% |
| No Response | 47% |

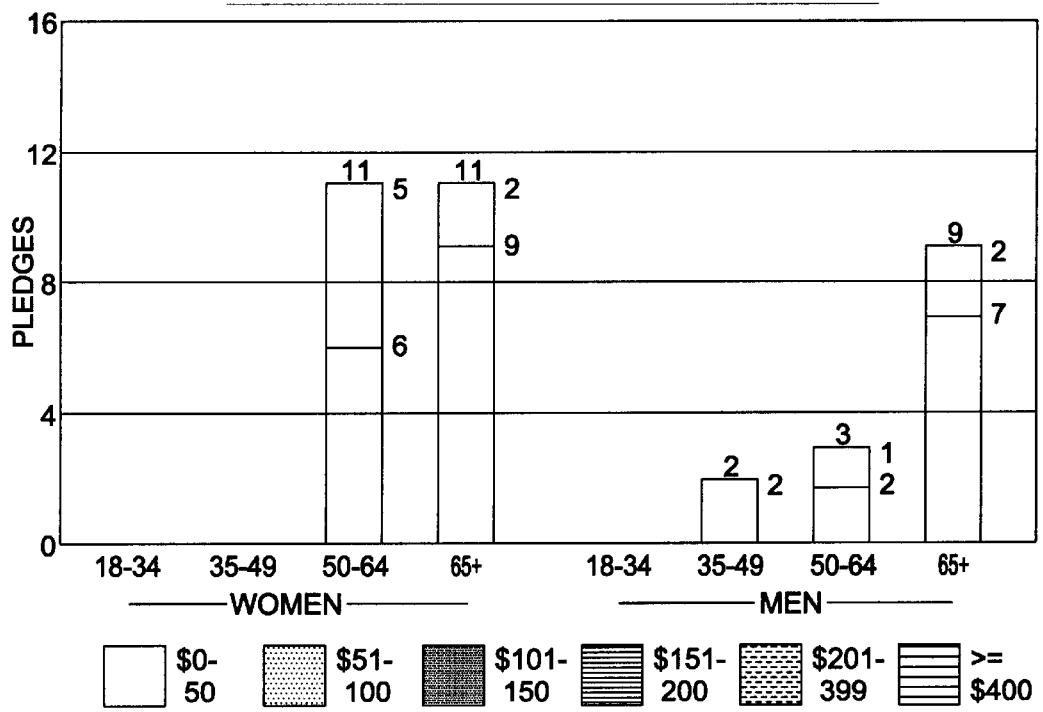

FIG. 6(f).

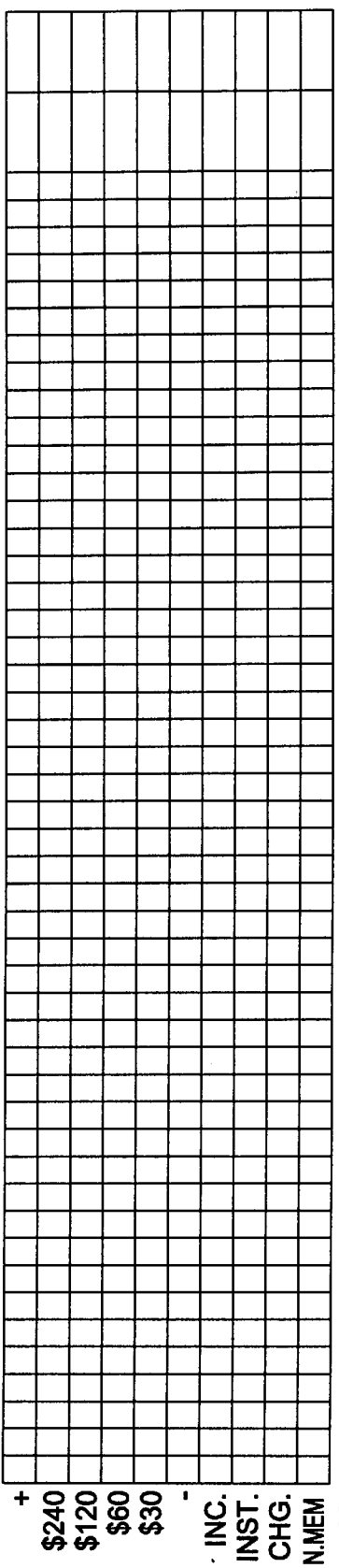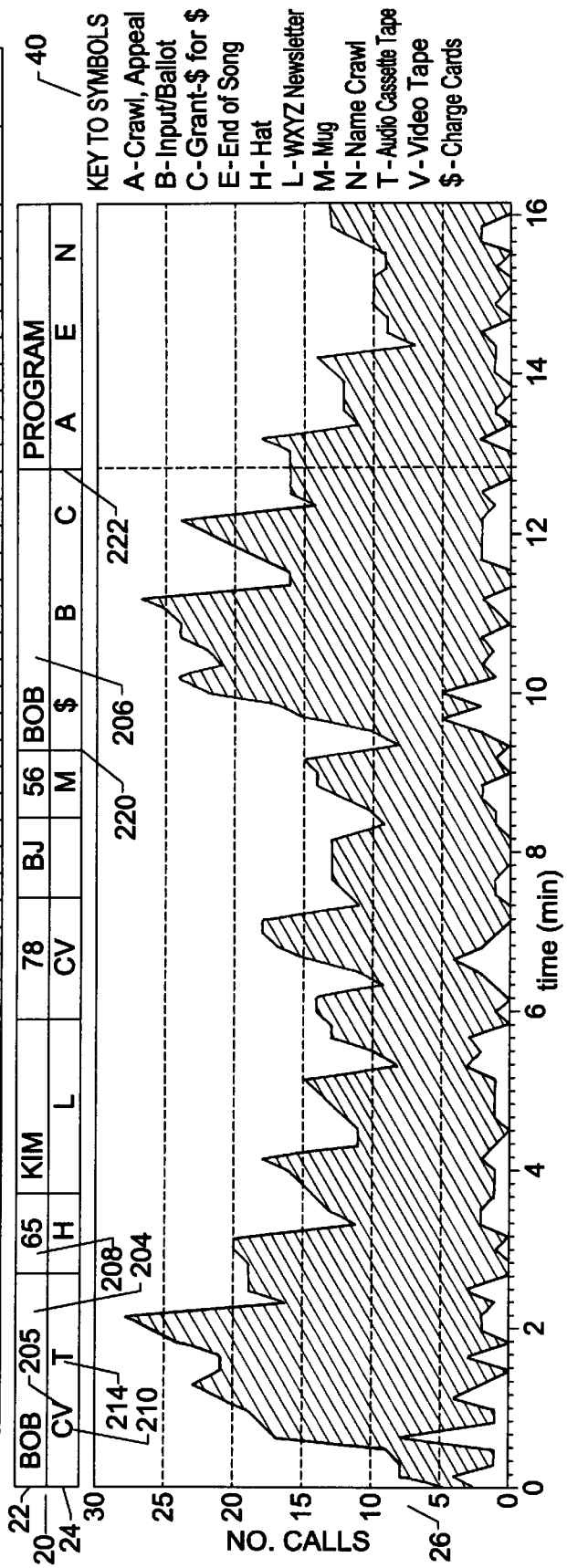
FIG. 7.

AUDIENCE RESPONSE MONITOR AND ANALYSIS SYSTEM AND METHOD

BACKGROUND OF THE INVENTION

1. Field of the Invention

The present invention relates to systems and methods for monitoring and analyzing interactions between parties in telephonic or electronic communication and, more particularly, to a system and method for monitoring and analyzing fund-raising and sales transactions occurring in response to a broadcast message.

2. Description of Related Art

Fund-raising and sales pitches delivered via broadcast media are by their very nature unidirectional; that is, a listener/viewer must initiate a response to the message, for instance, by making a telephone call. The results of such campaigns may be tabulated at a later time to gauge effectiveness of the pitch, but typically such tabulations cover a fairly wide time period and provide only general information such as dollars collected and number of items sold.

In the particular case of fund raising for public broadcasting, in so-called "pledge drives" a television or radio station requests their audience to donate money, sometimes in exchange for a premium. These pledge drives are typically spaced at predetermined intervals throughout a chosen time period during which regular programming is interrupted by a series of pitch segments, each segment comprising a multiplicity of elements that may include prerecorded and live portions.

Responses to the pledge drive are handled by a panel of operators who are usually volunteers or staff members. Each telephone call is routed via a switching system to an operator who uses a written script to interact with the caller. Information is collected by the operator, often manually, including pertinent data about the caller, such as name and address, amount pledged, premium desired, and method of payment. In some cases overflow of the panel may be handled by a toll-free number having a scripted messaging system for taking donations. These messages are then transcribed manually by an operator at a later time. Typically a cost is incurred to the station each time the toll-free number is utilized.

Two pieces of data collected from each caller are usually tabulated immediately: the pledge amount and the premium desired. The former is tracked so that proximity to a goal may be calculated and perhaps announced during a pitch segment; the latter, so that a particular premium is not promised after its stock has been depleted. For example, the station may have received three weekend getaway packages from a resort. Once those three have been requested as premiums, that item should not continue to be offered. This tabulation is performed by a trained staff member who must receive data from runners collecting the handwritten pledge forms from the operators. Thus there is a built-in delay in posting the information, and errors are easily made in total pledge amounts and in promised premiums.

In the following days (or even weeks) the tasks of data entry and pledge fulfillment are undertaken. The handwritten pledge forms are transcribed into a membership database, and the premiums selected by each donor are dispatched. In the case in which the donor has requested to be billed, a statement must also be prepared. When the donor has given a credit or debit card number, a funds collection must be initiated. If funds are for some reason uncollectable, some attempt may be made to recover the pledge from the donor.

Several systems have been disclosed that, while not addressing these problems directly, have described attempts to solve related issues.

The account servicing system of Szlam et al. (U.S. Pat. No. 4,797,911) obtains preliminary information from a customer and automatically updates a database with changes provided by the customer.

Schakowsky et al. (U.S. Pat. No. 4,989,234) have described an apparatus and method for handling a mass response to a broadcast promotion. The method entails capturing the telephone numbers of the calling parties who cannot be answered personally owing to an excess of simultaneous calls. Those numbers are then called back, and the response phase is completed.

Brown et al. (U.S. Pat. No. 5,164,983) teach a telemarketing system that compiles and processes traffic analysis data. In this system each telemarketer is assumed to be receiving calls for a plurality of clients or campaigns.

The call distribution system of Gechter et al. (U.S. Pat. No. 5,168,515) includes an automatic call distributing system to distribute incoming calls among a plurality of operators and to provide to the system information on the status of the operators.

Shaio (U.S. Pat. No. 5,299,260) discloses another call routing system, in this case comprising a means for assigning each call to an applications program, which may request further information from the caller.

SUMMARY OF THE INVENTION

It is an object of the present invention to provide a system for analyzing audience response to a broadcast promotion in time correlation with elements of the promotion.

It is an additional object to provide such a system that provides the analysis in real time.

It is a further object to provide such a system that eliminates errors caused by transcription of data from one medium to another.

It is another object to provide such a system that reduces both personnel and training requirements.

It is yet a further object to provide such a system that electronically initiates funds transfer and provides a record of exceptions.

It is yet another object to provide such a system that can be centrally controlled and can thus communicate electronically and instantaneously with a plurality of operators.

It is an additional object to provide such a system that shortens the transaction time between an operator and a customer/donor.

It is a further object to provide such a system that enables predictive telemarketing.

It is another object to provide such a system that inventories items offered to the audience members and prevents taking orders for the items once they are out of stock.

These and other objects are achieved by the system and method of the present invention, which is directed to an analysis of the audience response to a broadcast promotion that has a plurality of time-sequential segments. The system comprises a means for receiving a communication from an audience member at a time. Such a communication typically occurs across a telephone line, typically person-to-person, although the system may also be configured to permit person-to-computer, computer-to-person, and computer-to-computer interactions.

The system further comprises a means for storing response data and the time of the communication received from the audience member. In a particular embodiment this means comprises a computer terminal networked to a central processor having a central timing means. Response data may comprise information such as the audience member's name and address, an amount pledged, and a premium item desired.

A means for tabulating the response data and the communication times from all responding audience members is also included. In a preferred embodiment this tabulating means comprises software means resident in the processor that collects and tabulates response data entered into all the networked terminals.

An additional element of the system comprises a means for correlating in time the response data with the segments of the promotion. This provides effectiveness information for each segment of the promotion. Such effectiveness information may include such indications as the number of communications received, the amount of money pledged, and the popularity of a premium item offered.

In a particular embodiment the system may be configured to provide some or all of the effectiveness information on a real-time basis. With such data available virtually instantaneously, the overall effectiveness of the promotion may be optimized. Such fine tuning can be accomplished by, for instance, reoffering a particular premium item that appeared to elicit a strong response, or by increasing or decreasing a particular person's time on air if he or she is found to augment or depress audience response to the promotion.

Such a system for displaying real-time audience response comprises a plurality of communication receiving means, each switchable between an active state for receiving a communication from an audience member and an inactive state. These means typically comprise a bank of telephones, although, as will be seen, computer terminals may also serve.

The system further comprises means for counting with a predetermined frequency the plurality of communication receiving means in the active state for a predetermined minimum time for determining a number of valid communications. The counting means may comprise, for instance, a "tip and ring" scanner that determines when each telephone has been mediating a call for a minimum time that has been set to eliminate hang-ups or wrong numbers.

Once the number of active telephone calls has been counted, it is relayed to a means for displaying the number of valid communications in real time. This display means, typically a video monitor, thus provides a real-time indication of telephone activity. A further feature is provided with a time correlation of the number of valid communications with the segments of the promotion. Such a correlation provides effectiveness information for each segment of the promotion as it is occurring.

The correlation analysis, typically performed by a computer, may take the form of a graph having time as the abscissa and number of active telephone calls as the ordinate. Also along the time axis is displayed a series of codes relating to the segments of the promotion, which are entered into the computer manually. With this type of graphical display, a promotion coordinator can visualize virtually instantaneously how the audience is responding to each segment.

The method of the present invention comprises the steps of receiving a communication from an audience member at a time, storing response data and the time of the communication received from the audience member, tabulating the response data and the communication times from all responding audience members, and correlating in time the response data with the segments of the promotion, thereby providing effectiveness information for each segment of the promotion.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

BRIEF DESCRIPTION OF THE DRAWINGS

FIG. 2 illustrates the pledge automator screens: (a) initialization screen; (b) plege entry screen; (c) member information screen; (d) gift membership screen; (e) demographic information screen; (f) comment entry screen.

FIG. 5 is a daily tabulation of pledge break results.

FIG. 6 shows a program summary (a), (b) sorted by program; (c),(d) sorted by date; (e) sorted by pledge level; and (f) presented demographically.

FIG. 7 is a graphical presentation of a break analyzed using several parameters plotted against time.

DETAILED DESCRIPTION OF THE PREFERRED EMBODIMENTS

Figure 1:
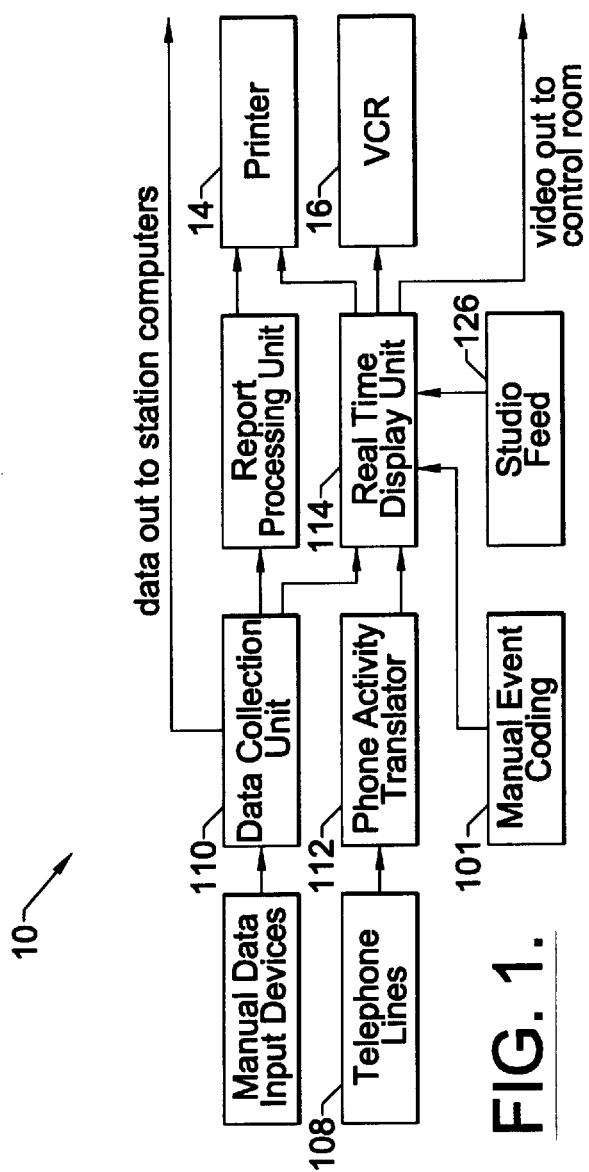
FIG. 1 is a schematic diagram of the real-time pledge automator system.

A description of the preferred embodiments of the present invention will now be presented with reference to FIGS. 1–8.

The system and method are for analyzing audience response to a broadcast promotion that has a plurality of time-sequential segments. In a preferred embodiment within the realm of public television, each pledge drive comprises at least one program 202 into or surrounding which is typically inserted at least one promotion. Each promotion in turn typically comprises a plurality of segments, which may be plotted along a time line 20 such as shown in FIG. 7. Along the top part 22 of the time line 20 are shown codes indicative of the on-air personality, such as "BOB" 204 and 206 and of the content of the on-air personality's pitch, such as offering a video tape "V" 205. Also shown are codes for prerecorded segments, such as "65" 208, a videotaped description of a premium hat "H" (see the "Key to Symbols" 40 on the lower right of FIG. 7).

Along the bottom part 24 of the time line 20 are shown codes indicating the content of each segment. For example, "BOB" discusses a "dollar-for-dollar" grant 210 (C) and offers video tape 205 (V) and audio cassette tape 214 (T) premiums during his first appearance 204.

Figure 3:
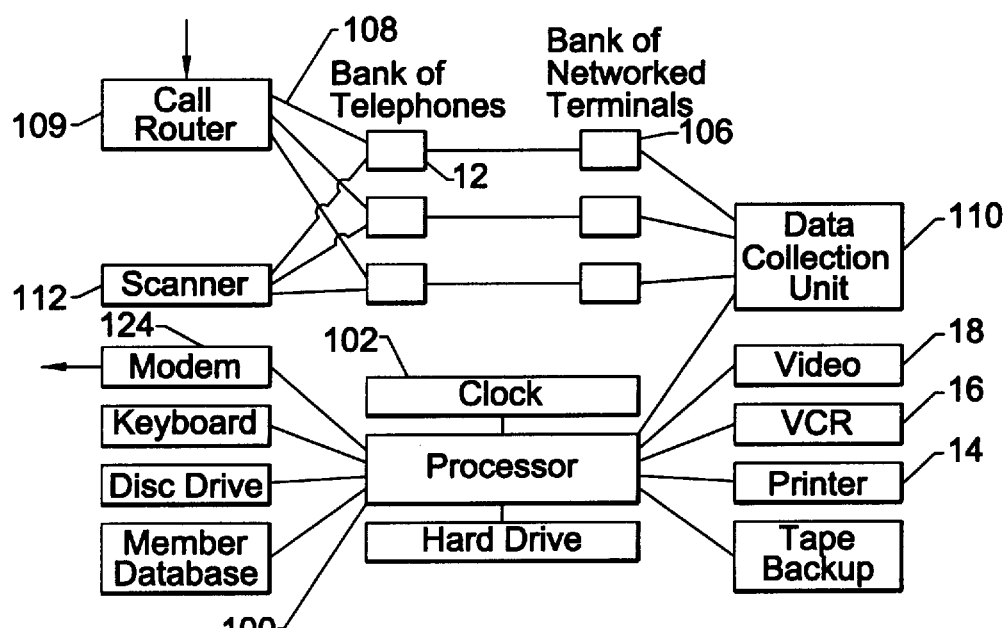
FIG. 3 is a schematic diagram of the break analyzer system.

The system 10 as shown in FIGS. 1 and 3 includes a processor 100 that comprises a timing means, such as an internal clock 102, and a storage means such as a hard drive 103, disc drive 104, or tape backup unit 105. The time line 20 may be entered via manual event coding 101 into the processor 100 either in real time or after the conclusion of the promotion, depending upon how quickly an analysis is desired. Usually the coding includes for each segment a label, such as "BOB," a start time 220, and an end time 222. It is this time line 20 that provides the basis for the analysis, and thus it is important that the clocking be accurate.

The system 10 also comprises a means for receiving a communication from an audience member at a time. In the embodiment illustrated in FIGS. 1 and 3, the audience member responds to the promotion by telephoning a televised number. Usually a bank of telephones 12, each attended by an operator, is available, either on site or remote from the broadcast site, for answering the communications. Utilizing a call routing device 109 known in the art, the incoming call is sent along telephone lines 108 to an operator whose telephone 12 is not busy, and the operator answers the call.

In order to eliminate wrong numbers and calls made by people who are not actually responding to the broadcast promotion, means are provided for determining whether the communication from the audience member is a valid communication. A scanner, or telephone activity translator 112, to be discussed below, is provided for counting incoming calls, but is set to count only those calls having a duration longer than a predetermined time, such as 15 seconds. In addition, the operator also filters out invalid calls, that is, those calls from audience members who are not offering to pledge.

Each operator is provided with an input device such as a networked terminal 106 into which response data from valid communications are entered and from which the data are routed to a collection unit 110 connected to the processor 100. The start time of the call may be logged by the operator, or it may be clocked by the processor internal clock 102.

An exemplary set of screens used by an operator for taking a pledge are illustrated in FIGS. 2(a)–(f). These screens are of course by way of example only, and they may be altered to suit a particular station or another application as needed.

Figure 2A:
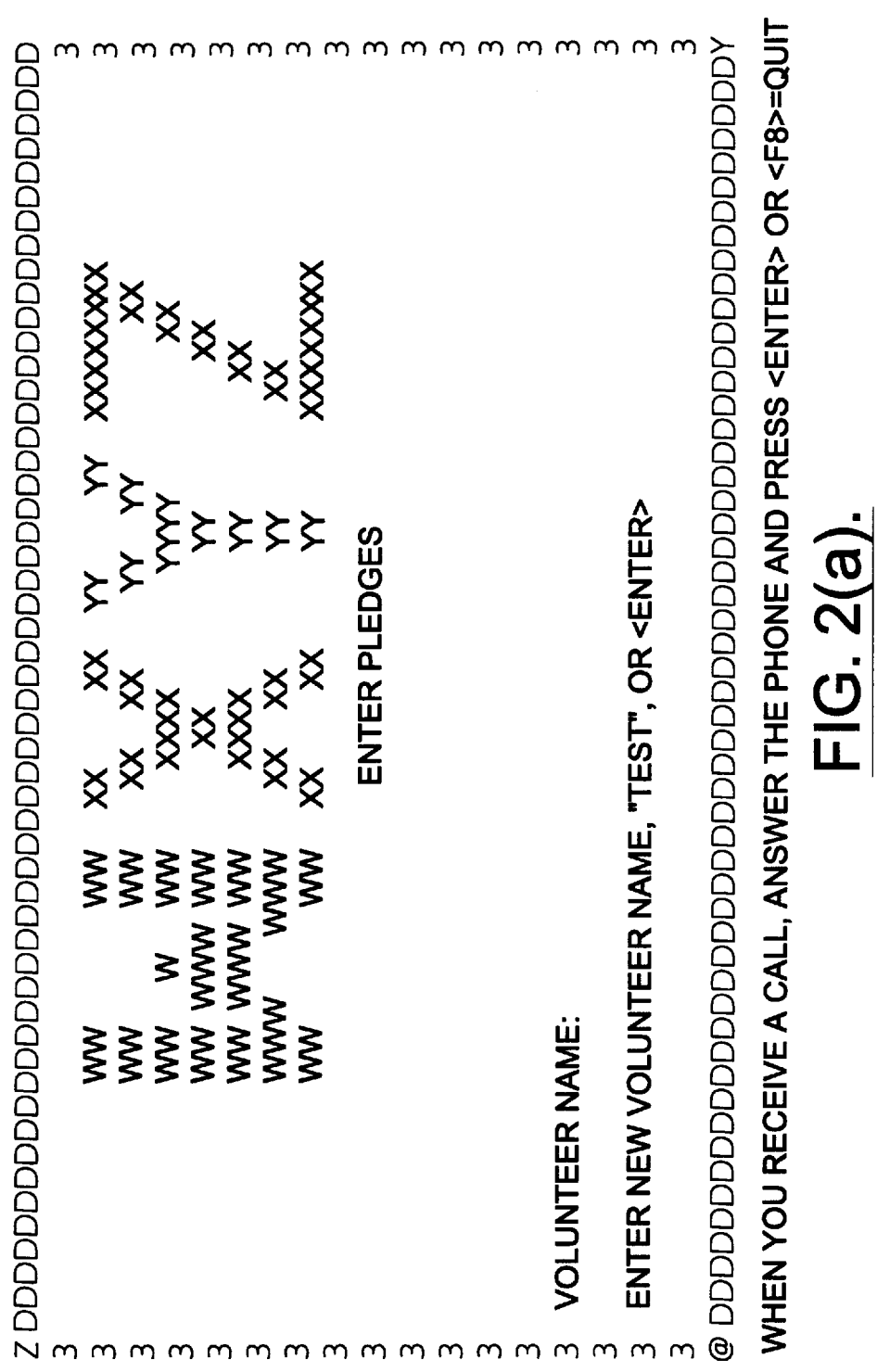

The initial screen, FIG. 2(a), requests the operator's name and initializes a new pledge. The second, FIG. 2(b), scripts the taking of the pledge amount, method of payment, and premium. The third, FIG. 2(c), requests membership, name, and address information. The fourth, FIG. 2(d), takes gift membership information. The fifth, FIG. 2(e), requests demographic information, and the sixth, FIG. 2(f), asks for comments.

In one embodiment a duplication algorithm is an element of the system, so that, when the caller's name is entered, the system scans the database for identical or similar names. The operator is then prompted to ask the caller whether any of these retrieved entries represents him or her, in order to avoid re-entering address information already present in the database.

Similarly, such a duplication algorithm can be run at the end of a pledge drive to clean up the database.

Another system for receiving response data comprises a device for capturing the caller's telephone number. With this number, software resident in the processor 100 then interfaces with the station's member database and retrieves name and address information on a member having that telephone number. If no member with the caller's telephone number exists in the member database, the operator requests the name and address information of the caller as above. Of course, even if an entry corresponding to the caller's telephone number exists in the station's database, the operator still should confirm the caller's name and address in case of error or in case the caller is not in fact the member retrieved from the database.

As the response data are entered into a terminal by an operator, they are stored, along with the time the call was received and the duration of the call, in the computer 100 in a database specifically designed for this system. Utilizing software resident in the computer, a coordinator may request a tabulation and time correlation of the response data in a number of forms, which will be discussed in detail in the following.

In addition to storage in the computer database, various means of backup are provided, including, but not limited to, tape and disc systems.

Once the coordinator has requested an analysis and the processor has performed it, means are provided for displaying the analysis. Referring to FIGS. 1 and 3, it can be seen that such display means may include, but are not limited to, a printer 14, a video cassette recorder 16, or a video screen 18.

As mentioned, an additional feature of the system 10 comprises means for polling the bank of telephones to determine which telephones are busy. In a preferred embodiment this phone activity translator 112 comprises a "tip and ring" scanner that determines the presence of a valid call on a line, that is, one that lasts at least a predetermined time. A specific predetermined time for a valid call is generally in the range of 15 seconds. The scanner polls each telephone at a predetermined frequency, in the embodiment treated herein, approximately 100 times per second.

Some exemplary displayed pledge break analyses are illustrated in FIGS. 4–8. A common thread in all of these respresentations is that the response data-time correlations provide an indication of the effectiveness of the promotion segments in the promotion. It is important to note also that, when effectiveness data are plotted against time (specifically, against the time line of the segment), there is a delay time between an audience member seeing an element of the segment and actually initiating a communication. Studies have shown that such a delay is in the general range of 20 seconds.

With regard to the present example of a public television pledge drive, a "promotion" may comprise a single pledge break inserted either between programs or into a program. In this case a "segment" may connote one portion of the pledge break, such as a video tape describing a premium item. Possible exemplary analyses with the use of these definitions are illustrated in FIGS. 4, 7, and 8.

Figure 4:
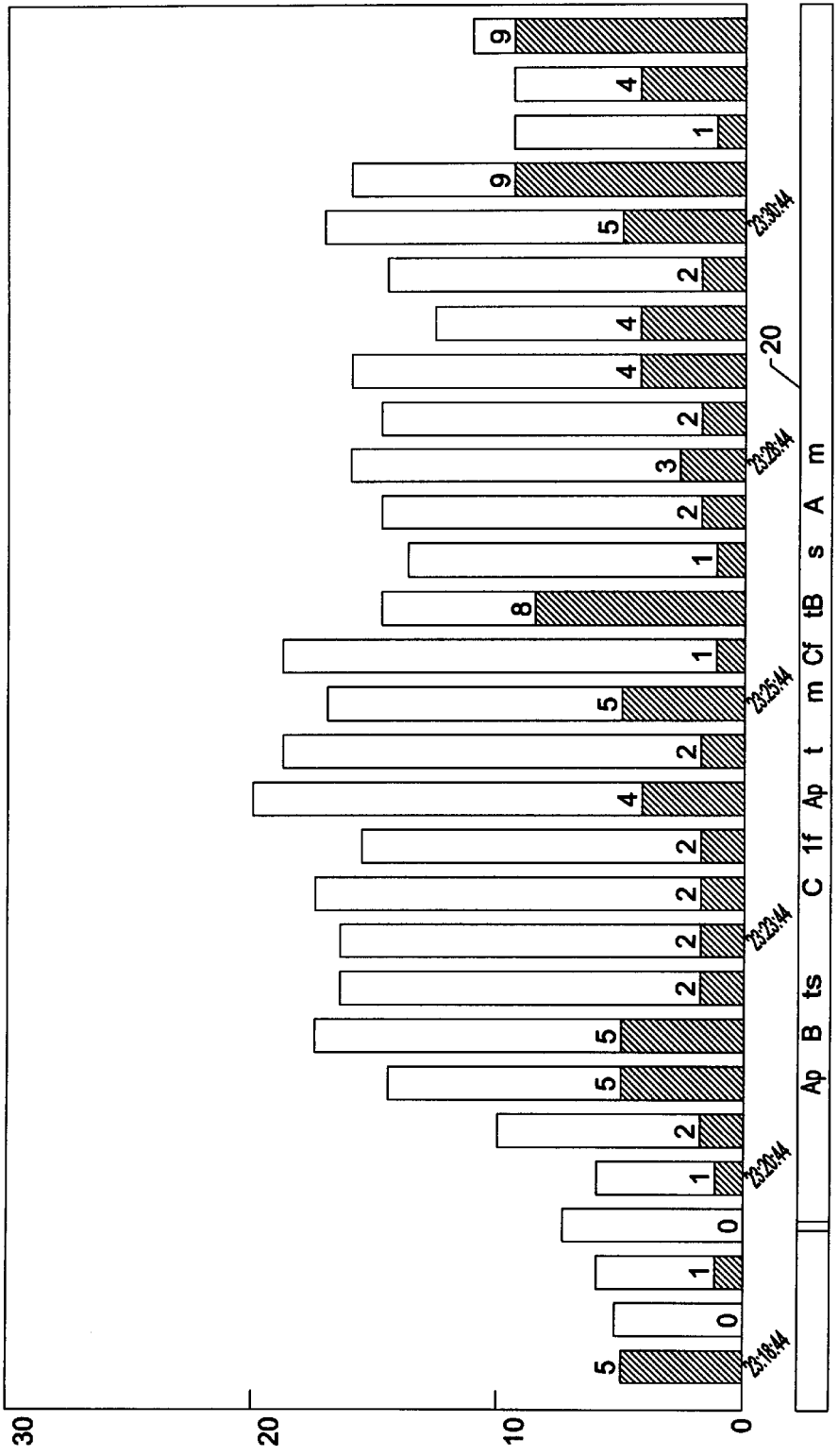
FIG. 4 charts the number of calls received versus time.

In FIG. 4 is illustrated a plot of the number of calls received versus time. The predetermined minimum time for a valid call is set at 15 seconds, and each bar in the plot encompasses an interval of 30 seconds. The empty part of each bar represents the load on the bank of telephones, that is, the total of all active telephones; the filled part of each bar represents the portion deemed to be valid calls. Beneath the time axis the time line 20 runs concurrently, with codes representing the content of each segment. Within the box at the upper right are statistics for the pledge break, including the total number of invalid calls, the number of valid calls, and the duration distribution of all calls.

At the bottom of FIG. 7 is shown a graph 26 of the number of calls plotted against time. The segments presented above the graph on the time line 20 have already been discussed.

Figure 8:
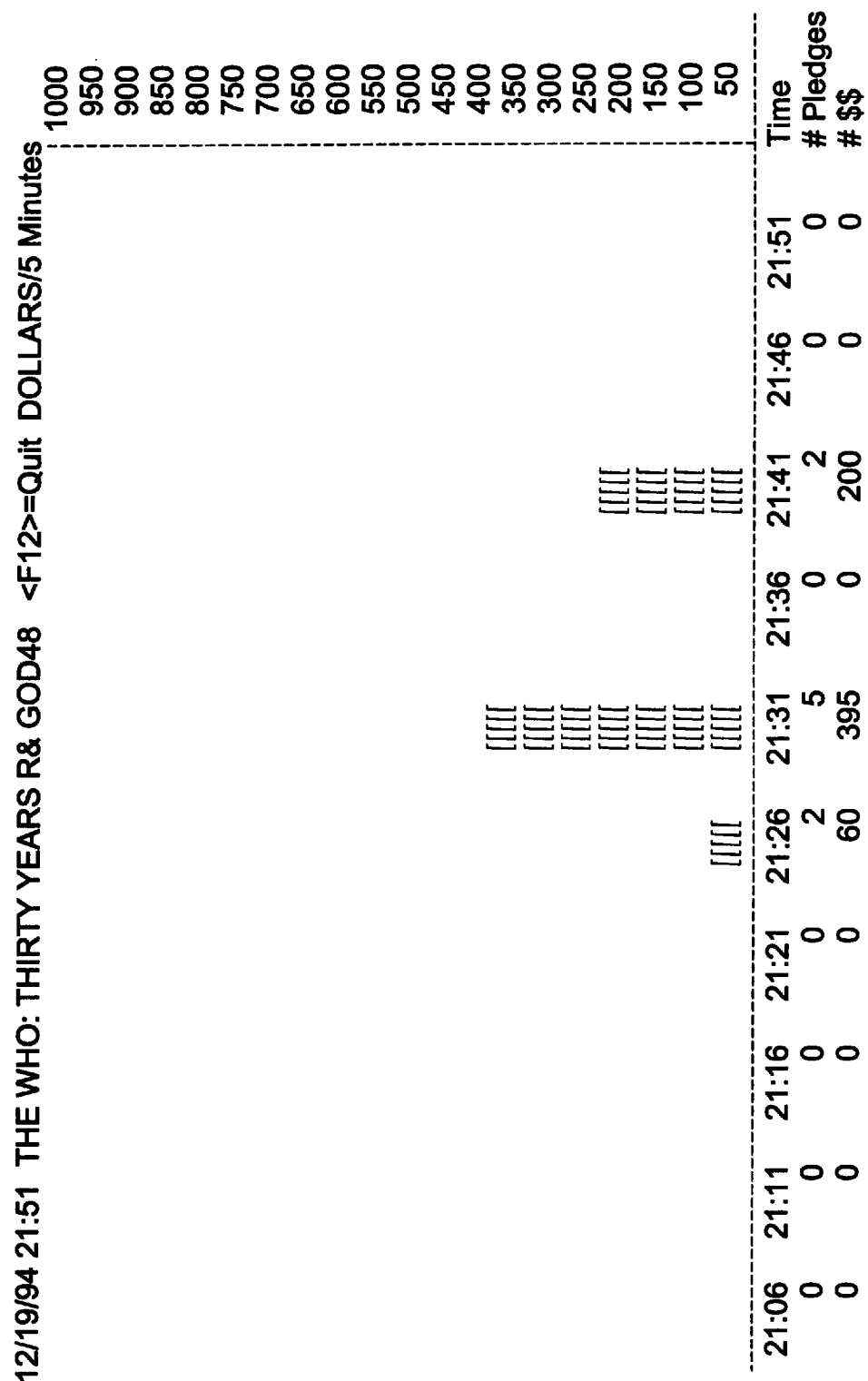
FIG. 8 is a graphical presentation of a break analyzed for dollars pledged versus time in 5-minute increments.

In FIG. 8 is plotted, in 5-minute intervals, the dollars pledged during a pledge break. Ancillary abscissae are also provided, concurrently indicating the number of pledges and dollars pledged for each 5-minute interval.

In another embodiment a "promotion" may comprise the entire campaign, in which case a "segment" may connote an entire pledge break. The type of information that may be provided by this aspect of the system is illustrated in FIGS. 5 and 6.

FIG. 5 presents in tabular form the effectiveness of a series of pledge breaks structured around a day's programming. For each program are listed the number of breaks televised, the total time devoted to the breaks, the number of pledges processed, the amount of money per minute of pledge time, the average amount pledged, and the total amount of money pledged during the program. For this example it can be seen that "The Three Tenors in Concert" elicited both the most money and the greatest number of pledges for this particular station. With this information in hand, the station would most likely run this program again during the next pledge drive, positioning it for maximum exposure. This type of data can also be correlated with ratings and demographic data to match program exposure to the audience population, and thereby optimize pledge potential.

In FIG. 6 is presented a series of tabulations summarizing the results of pledge breaks for particular programs. A first page of an alphabetized report generated by the system is shown in FIG. 6(a), (b) listing for each program the time devoted to pledging, the number of breaks, the number of pledges received, the total amount of money pledged, the average amount pledged, the amount of money pledged per minute, the percentage pledge using credit cards, the membership status of the person pledging, and what proportion were gift memberships.

The same information is presented in FIG. (c), (d) except that here the data are sorted by date, and one day's results are tabulated. Yet another sorting method is shown in FIG. 6(e), wherein the level of amount pledged is used as the variable by which to tabulate the response data.

In FIG. 6(f) is summarized response data for one pledge break, tabulating, as in FIG. 6(e), pledge levels, but also presenting a plot of pledge level grouped by demographics.

Another type of information may be obtained using the system of the present invention. If a particular feature of the promotion, referred to as a first feature, occurs twice, that is, during a first and a second nonsequential segment, means are further provided for integrating the response data of the first feature over the first and the second segments. As an example, as shown in FIG. 7, "BOB" appears twice at 204 and 206. The response data for these two segments can be integrated to determine BOB's overall effectiveness on air as compared with other personalities.

Similarly, effectiveness information on a segment in one promotion that has an analogous segment in another promotion can be correlated in order to determine an overall effectiveness of this segment over a series of promotions. For example, if "BOB" appears over several evenings, the response data gleaned from the communications with audience members can be integrated by the system to provide an indication of BOB's effectiveness on air.

If the system of the present invention is utilized on a plurality of public television stations across the country, additional correlations are possible. A central location could access all participating stations' databases via modem 124 and prepare reports based on the average effectiveness information. Customized reports could also be generated for each station comparing their fund-raising performance with the average, based on any available parameter such as demographics, audience size, and program being broadcast.

Again using the example of a public television pledge drive, premium items are typically offered in exchange for various levels of pledges. Another type of effectiveness information is provided by tracking the number of calls received in response to that item's being offered and also whether that item was in fact requested. An additional feature of the system includes the ability to keep a running total of the requests for that item and to indicate to an operator that the total requests for the item offered has reached a predetermined level, which represents the level of that item in stock. This feature thus prevents the operator from accepting an additional request for the item and then not being able to fulfill the request. A particular indicating means comprises a counting algorithm in the system software that compares the running total with the stock level. When they are equal, the software will refuse to accept a request on a screen such as shown in FIG. 2(b), and will instead send a message to the operator that the premium item is out of stock.

The system of the present invention also has the capability of generating real-time information on the effectiveness of segments of a promotion. The benefit of having such information in real time is that a coordinator may decide to alter subsequent segments of the promotion in order to optimize an overall effectiveness of the promotion.

As shown in FIG. 1, the system is provided with a real-time display unit 114, to which is fed data from the data collection unit 110, the phone activity translator 112, and a manual event coder 101. A live studio feed 126 is also communicated to the real-time display unit 114 so that the coordinator can simultaneously view the promotion along with the response data. For example, a graph such as that shown in FIG. 4 can be generated in real time and shown to the coordinator on a split videographic screen 18 in synchrony with the promotion. In addition, as shown in FIG. 1, the real-time display unit can also transmit data to a video cassette recorder 16 and/or to a printer 14.

Since the response data are entered directly into the computer and do not require transcription, another module may be used to collect all credit card data for batch processing of electronic funds transfers via modem 124, without human intervention, again saving time and personnel and reducing errors. In addition, exceptions (failed transfers) can be tabulated immediately, and the corresponding audience members recontacted to correct their response data.

A further automation is possible in the form of premium fulfillment. Since the system already has in its database the item requested and the name and address of the recipient, mailing labels can be printed directly for each premium item. In addition, if a magazine subscription is offered, the subscriber database can be updated automatically. Acknowledgment letters and envelopes can also be generated immediately upon successful funds transfer, or, in the case of pledges to be remitted by mail, a statement can be generated after a predetermined time if the pledged amount does not arrive. Even greater automation may be utilized with the addition of a voice mail script. Typically this option will work best for audience members already in the station's database, so that lengthy inputting of names and addresses is avoided. A hybrid system would include an initial answering system that electronically routes callers not in the database to a live operator and permits callers in the database to continue on the automated system.

A totally automated system is achievable if the caller accesses the pledge system via a computer over the telephone lines. In this case the station's computer generates screens that appear on the caller's computer monitor, and the caller enters his or her own response data, which are routed as previously discussed to the data collection unit 110.

Another potential use for the system of the present invention is as a telemarketing tool. Having the response data from previous broadcast promotions in the form of a name, an address, and a telephone number of the audience member, the system in this embodiment further comprises means for accessing the correlated response data and promotion segments and means for communicating with the audience member during a repeat broadcast of the broadcast promotion after a predetermined time.

This embodiment in an exemplary form can be used for contacting previous audience members chosen from the database. The system software is requested by the coordinator to access all audience members who called in pledges during a program being repeated from a previous pledge drive. The system is further requested to filter out those audience members who have pledged during the present pledge drive. Then the system is requested to separate the remaining audience members into three groups: (1)lapsed members, (2) members due for renewal, and (3) members who are current.

The computer then can be instructed to dial the telephone numbers for all three groups sequentially and route each answered call to an operator, and the operator attempts to locate the named audience member to request a pledge. Depending upon the group to which the dialed party belongs, an appropriate script is displayed to the operator on a terminal screen.

For each of the three groups, different scripts will have been prepared for display. For all three groups, the script might begin with the operator informing the party that a program he or she enjoyed previously is being or is going to be rebroadcast. Then, for instance, lapsed members and those due for renewal will be asked to renew; current members will be asked for an additional pledge or to upgrade their memberships. The advantage of such a predictive dialing scheme is that an assumption can be made that the audience member being contacted had a favorable reaction to that program during a prior airing, and thus the chances of a positive response are increased.

It may be appreciated by one skilled in the art that additional embodiments may be contemplated, including systems and methods for televised shopping promotions, radio promotions, telethons, and survey conducting.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus and method illustrated and described herein are by way of example, and the scope of the invention is not limited to the exact details of construction.

Having now described the invention, the construction, the operation and use of preferred embodiment thereof, and the advantageous new and useful results obtained thereby, the new and useful constructions, and reasonable mechanical equivalents thereof obvious to those skilled in the art, are set forth in the appended claims.

What is claimed is:

1. A system for analyzing audience response to a broadcast promotion having a plurality of time-sequential segments, the system comprising:

means for receiving a communication from an audience member at a time;

means for storing response data comprising means for storing a name, an address, and a telephone number of the audience member and the time of the communication received from the audience member;

means for tabulating the response data and the communication times from all responding audience members;

means for correlating in time the response date with the segments of the promotion, thereby providing effectiveness information for each segment of the promotion;

means for accessing the correlated response data and promotion segments for a specific broadcast promotion and for forming a set of audience members, the set including all audience members who communicated during the specific broadcast promotion; and means for initiating a communication with the set of audience members during a repeat broadcast of the specific broadcast promotion after a predetermined time for attempting to elicit a response from the audience members.

2. The system recited in claim 1, further comprising means for displaying the time correlation of the response data.

3. The system recited in claim 1, wherein the plurality of segments comprises a first segment and a second segment, each comprising a common feature, the first and the second segments being nonsequential, further comprising means for integrating the response data of the common feature over the first and the second segments, thereby providing effectiveness information for the common feature of the promotion.

4. The system recited in claim 1, further comprising means for determining whether the communication from the audience member is a valid communication, and wherein the means for storing response data and the time of the communication received from the audience member comprises means for storing response data and the time of the valid communication received from the audience member.

5. A system for analyzing audience response to a plurality of broadcast promotions, each having a plurality of time-sequential segments, at least one segment in one promotion having a like segment in another promotion, the system comprising:

means for receiving a communication from an audience member at a time;

means for storing response data comprising means for storing a name, an address, and a telephone number of the audience member and the time of the communication received from the audience member;

means for tabulating the response data and the communication times from all responding audience members for each promotion;

means for correlating in time the response data with the segments of each promotion, thereby providing effectiveness information for each segment of each promotion;

means for correlating the effectiveness information for like segments from the plurality of promotions, thereby providing effectiveness information for each segment over the plurality of promotions;

means for accessing the correlated response data and promotion segments for a specific broadcast promotion and for forming a set of audience members, the set including all audience members who communicated during the specific broadcast promotion; and means for initiating a communication with the set of audience members during a repeat broadcast of the specific broadcast promotion after a predetermined time for attempting to elicit a response from the audience members.

6. A method for analyzing audience response to a broadcast promotion having a plurality of time-sequential segments, the method comprising the steps of:

receiving a communication from an audience member at a time;

storing response date comprising a name, an address, and a telephone number of the audience member and the time of the communication received from the audience member;

tabulating the response data and the communication times from all responding audience members;

correlating in time the response data with the segments of the promotion, thereby providing effectiveness information for each segment of the promotion;

accessing the correlated response data and promotion segments for a specific broadcast promotion and forming a set of audience members, the set including all audience members who communicated during the specific broadcast promotion; and initiating a communication with the set of audience members during a repeat broadcast of the specific broadcast promotion after a predetermined time for attempting to elicit a response from the audience members.

7. The method recited in claim 6, further comprising the step of displaying the time correlation of the response data.

8. The method recited in claim 6, wherein the plurality of time-sequential segments comprises a first and a second segment, each comprising a common first feature, the first and the second segments being nonsequential, further comprising the step of integrating the response data of the first feature over the first and the second segments, thereby providing effectiveness information for the first feature of the promotion.

* * * * *